(12) United States Patent
Lin (10) Patent No.: US 10,635,612 B2
(45) Date of Patent: Apr. 28, 2020

(54) COMPUTER SYSTEM AND INTERRUPT EVENT HANDING METHOD THEREOF

(71) Applicant: Wistron Corporation, New Taipei (TW)

(72) Inventor: Huei-Jhen Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/980,755

(22) Filed: May 16, 2018

(65) Prior Publication Data

US 2019/0251047 A1    Aug. 15, 2019

(30) Foreign Application Priority Data

Feb. 12, 2018 (TW) .............................. 107104914 A (51) Int. Cl.
*G06F 13/24* (2006.01)
*G06F 12/02* (2006.01)

(52) U.S. Cl.
CPC ............ *G06F 13/24* (2013.01); *G06F 12/023* (2013.01); *G06F 2212/251* (2013.01); *G06F 2213/2424* (2013.01)

(58) Field of Classification Search
None
See application file for complete search history.

(56) References Cited

U.S. PATENT DOCUMENTS

| | | | | |
|---|---|---|---|---|
| 5,937,200 A * | 8/1999 | Frid | ...................... | G06F 1/3203 710/264 |
| 2003/0063071 A1 * | 4/2003 | Wyatt | .................... | G06F 13/102 345/172 |
| 2005/0138256 A1 | 6/2005 | Bolay et al. | | |
| 2005/0198421 A1 * | 9/2005 | Nalawadi | .............. | G06F 9/4411 710/260 |
| 2008/0098146 A1 * | 4/2008 | Lee | .......................... | G06F 13/24 710/269 |
| 2016/0055108 A1 * | 2/2016 | Williamson | ............ | G06F 13/32 710/261 |
| 2016/0179721 A1 * | 6/2016 | Neiger | .................... | G06F 13/34 710/264 |
| 2017/0139852 A1 * | 5/2017 | Xu | .......................... | G06F 13/24 |
| 2017/0212851 A1 * | 7/2017 | Jayasena | ................. | G06F 13/24 |

FOREIGN PATENT DOCUMENTS

| CN | 1898646 | 9/2012 |
|---|---|---|
| CN | 105760314 | 7/2016 |

* cited by examiner

*Primary Examiner* — Elias Mano
(74) *Attorney, Agent, or Firm* — JCIPRNET (57) ABSTRACT

A computer system and a handling method thereof for an interrupt event are provided. The computer system includes an embedded controller, a system memory, and a processing unit. The embedded controller has an internal memory and triggers an interrupt event. The processing unit is coupled to the embedded controller and the system memory, and receives a notification of the interrupt event. In response to the interrupt event, the processing unit reads an event identifier corresponding to the interrupt event at a specific address section in the internal memory or maps the event identifier corresponding to the interrupt event at the specific address section in the internal memory of the embedded controller to the system memory. The processing unit notifies a hardware driver program corresponding to the event identifier. Accordingly, efficiency of handling the interrupt event is effectively enhanced.

22 Claims, 4 Drawing Sheets

COMPUTER SYSTEM AND INTERRUPT EVENT HANDING METHOD THEREOF

CROSS-REFERENCE TO RELATED APPLICATION

This application claims the priority benefit of Taiwan application serial no. 107104914, filed on Feb. 12, 2018. The entirety of the above-mentioned patent application is hereby incorporated by reference herein and made a part of this specification.

BACKGROUND OF THE INVENTION

1. Field of the Invention

The invention relates to a communication technology in a computer system. More particularly, the invention relates to a computer system and an interrupt event handling method thereof.

2. Description of Related Art

A general computer system may be connected to or equipped with a keyboard, a button, a switch or other peripheral devices which are provided for user operation to control the computer system. The operation system (OS) is informed of the triggering actions of these peripheral devices by the embedded controller (EC) most of the time. For instance, with reference to a computer system 1 of FIG. 1, it is assumed that a user presses a button 110 configured for activating wireless communication function, an embedded controller 120 detects a corresponding hardware event in response to pressing of the button 110 (step S101). The embedded controller 120 informs an operation system 130 that a system control interrupt (SCI) event is triggered (step S102). As such, the operation system 130 issues an 84h command to the embedded controller 120 to inquire the system control interrupt event (step S103) and obtains an event identifier (e.g., 0xxx) corresponding to the system control interrupt event from the embedded controller 120 through an input/output (I/O) accessing method (step S104). The operation system 130 executes a content of, for example, a_Qxx( ) program recorded by an advanced configuration and power interface source language (ASL) program stored by a firmware interface 140 in response to obtaining the event identifier (step S105). The operation system 130 accordingly notifies a hardware driver program 151 of a wireless communication module 150 (step S106) to activate or deactivate the wireless communication module 150. Nevertheless, in the I/O accessing method in which the event identifier is obtained through issuing a command, time in milliseconds (ms) is required most of the time. When a large number of events are triggered, operation delay may occur, and the user may experience unfavorable experience.

SUMMARY OF THE INVENTION

The invention provides a computer system and an interrupt event handling method thereof in which an event identifier is obtained through a memory accessing method and that a processing speed is accelerated.

The invention provides an interrupt event handling method suitable for a computer system. The computer system includes an embedded controller (EC). The interrupt event handling method includes the following steps. A notification of the interrupt event from the embedded controller is received. An event identifier corresponding to the interrupt event at a specific address section in an internal memory of the embedded controller is read or the event identifier corresponding to the interrupt event at the specific address section in the internal memory of the embedded controller is mapped to a system memory in response to the interrupt event. A hardware driver program corresponding to the event identifier is notified.

In an embodiment of the invention, the step of mapping the event identifier corresponding to the interrupt event at the specific address section in the internal memory of the embedded controller to the system memory includes the following. The event identifier corresponding to the interrupt event is stored to the specific address section in the internal memory of the embedded controller. Data recorded at the specific address section in the internal memory is mapped to the system memory. The data in the internal memory being mapped to the system memory is removed.

In an embodiment of the invention, the data recorded at the specific address section in the internal memory further includes a plurality of other triggered event identifiers.

In an embodiment of the invention, the step of reading the event identifier corresponding to the interrupt event at the specific address section in the internal memory of the embedded controller or mapping the event identifier corresponding to the interrupt event at the specific address section in the internal memory of the embedded controller to the system memory in response to the interrupt event includes the following. An identifier access program is called to execute an access operation for the event identifier is executed. The identifier access program is an advanced configuration and power interface source language (ASL) program, an interface program of an operation system (OS) run by the computer system, or an interface program recorded in a firmware interface of the computer system to communicate with the operation system.

In an embodiment of the invention, the step of mapping the data recorded at the specific address section in the internal memory to the system memory includes the following. The data recorded at the specific address section in the internal memory is appended behind unprocessed data in the system memory.

In an embodiment of the invention, the step of mapping the data recorded at the specific address section in the internal memory ahead of the system memory includes the following. A leading byte is provided by the embedded controller according to priority of the interrupt event. The leading byte and the event identifier of the interrupt event are simultaneously recorded by the embedded controller to the internal memory thereof.

In an embodiment of the invention, the step of mapping the data recorded at the specific address section in the internal memory to the system memory includes the following. The event identifier and the leading byte are sorted ahead of other data related to the event identifier recorded in the system memory.

In an embodiment of the invention, the step of sorting the event identifier and the leading byte ahead of other data related to the event identifier recorded in the system memory further includes the following. Corresponding two event identifiers are sorted according to priority of the leading byte and another leading byte if the another leading byte is recorded in the system memory.

In an embodiment of the invention, the step of notifying the hardware driver program corresponding to the event identifier includes the following. The corresponding hardware driver program is notified according to an order of the event identifier in the system memory.

In an embodiment of the invention, the interrupt event handling method further includes the following step after the corresponding hardware driver program is notified. A processed event identifier in the system memory is removed and unprocessed data in the system memory is re-sorted in response to removal of the processed event identifier or mapping of at least one new event identifier to the system memory from the internal memory of the embedded controller.

The invention further provides a computer system including an embedded controller, a system memory, and a processing unit. The embedded controller has an internal memory and triggers an interrupt event. The processing unit is coupled to the embedded controller and the system memory and receives a notification of the interrupt event from the embedded controller. In response to the interrupt event, the processing unit reads an event identifier corresponding to the interrupt event at a specific address section in the internal memory, or the embedded controller maps the event identifier corresponding to the interrupt event at the specific address section in the internal memory to the system memory. The processing unit notifies a hardware driver program corresponding to the event identifier.

In an embodiment of the invention, the embedded controller stores the event identifier corresponding to the interrupt event to the specific address section in the internal memory. The processing unit maps data recorded at the specific address section in the internal memory to the system memory. The embedded controller removes the data being mapped to the system memory in the internal memory.

In an embodiment of the invention, the data recorded at the specific address section in the internal memory further includes a plurality of other triggered event identifiers.

In an embodiment of the invention, the processing unit calls an identifier access program to execute an access operation for the event identifier. The identifier access program is an advanced configuration and power interface source language program, an interface program of an operation system run by the computer system, or an interface program recorded in a firmware interface to communicate with the operation system.

In an embodiment of the invention, the embedded controller appends the data recorded at the specific address section in the internal memory behind data unprocessed by the processing unit in the system memory.

In an embodiment of the invention, a leading byte is provided by the embedded controller according to priority of the interrupt event. The leading byte and the event identifier of the interrupt event are simultaneously recorded by the embedded controller to the internal memory.

In an embodiment of the invention, the processing unit sorts the event identifier and the leading byte ahead of other data related to the event identifier recorded in the system memory.

In an embodiment of the invention, corresponding two event identifiers are sorted by the processing unit according to priority of the leading byte and another leading byte if the another leading byte is recorded in the system memory.

In an embodiment of the invention, the computer system further includes a functional hardware module related to the event identifier. The functional hardware module is coupled to the processing unit. The processing unit notifies a hardware driver program of the functional hardware module according to an order of the event identifier in the system memory.

In an embodiment of the invention, the processing unit removes a processed event identifier in the system memory and re-sorts unprocessed data by the processing unit recorded in the system memory according to priority in response to removal of the processed event identifier or mapping of a new event identifier to the system memory from the internal memory.

To sum up, in the embodiments of the invention, the event identifier is no longer obtained through sending the 84h command, and the internal memory of the embedded controller or the event identifier recorded at the specific address section in the system memory is read instead for saving processing time. In the embodiments of the invention, the corresponding event identifier is re-sorted according to priority, as such, the event with a high level of priority is processed as soon as possible.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
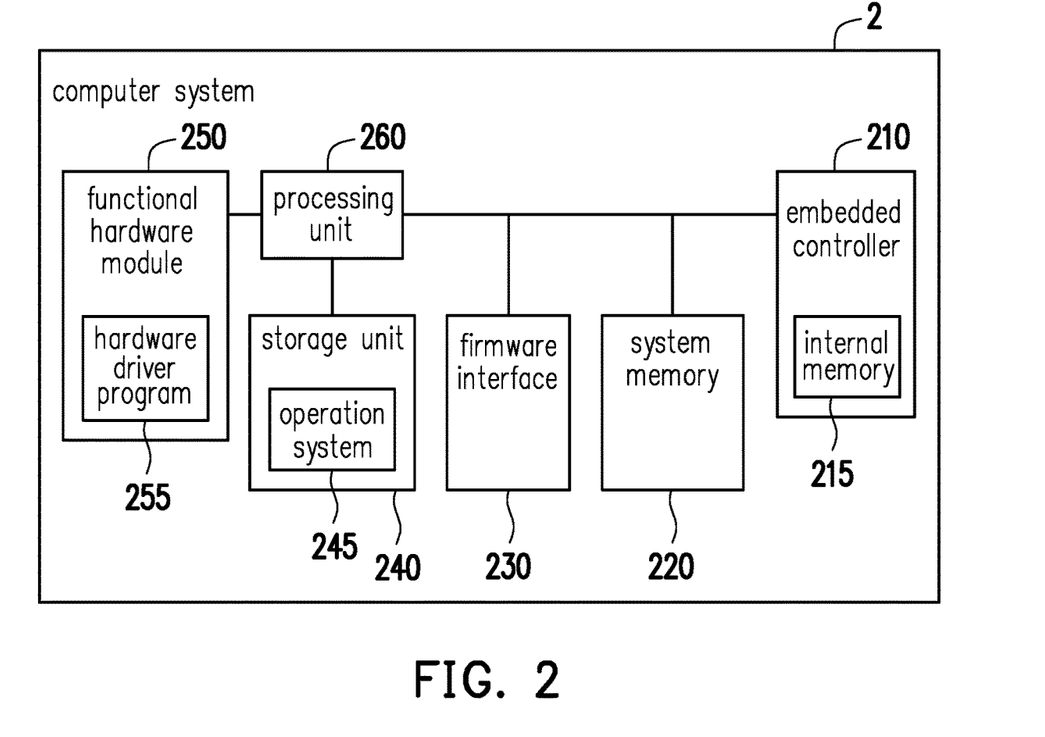
FIG. 2 is a block diagram of components of a computer system according to an embodiment of the invention.

FIG. 2 is a block diagram of components of a computer system 2 according to an embodiment of the invention. The computer system 2 may be a desktop computer, a notebook computer, a workstation, a server, or any other electronic device. The computer system 2 at least includes (but is not limited to) an embedded controller (EC) 210, a system memory 220, a firmware interface 230, a storage unit 240, a functional hardware module 250, and a processing unit 260.

The embedded controller 210 includes a processing chip, a circuit or a micro-controller, and an internal memory 215 (e.g., a fixed or a movable random access memory (RAM), a read-only memory (ROM), a flash memory in any form, etc.). The embedded controller 210 may be connected to a peripheral device such as a keyboard, a button, a mouse, a touch panel.

The system memory 220 is coupled to the embedded controller 210 and may be a fixed or a movable random access memory and a flash memory in any form. The firmware interface 230 is coupled to the embedded controller 210 and may be a basic input output system (BIOS), an extensible firmware interface (EFI), or an interface of another type which records a firmware program.

The firmware interface 230 records at least one advanced configuration and power interface source language (ASL) program to control the embedded controller 210, and operation of the program is described in detail in the embodiments as follows. The storage unit 240 may be a fixed or a movable random access memory in any form, a flash memory, a hard disk drive (HDD), and a solid state drive (SSD) and is configured for storing an operation system (OS) 245 (e.g., Windows, Linux, MAC OS, Chrome OS, etc.), a various types of software modules (e.g., various types of executable files, link function libraries, interface programs communicating with the operation system 245 and/or the embedded controller 210, program codes, etc.), files, and data.

The functional hardware module 250 may be a hardware module of various types, for example, a wireless communication module such as a Wireless Fidelity (Wi-Fi) module and a Bluetooth module, a keyboard backlight module, and a display module such as a liquid-crystal display (LCD) and a light-emitting diode (LED) display and is controlled by a corresponding hardware driver program 255.

The processing unit 260 is coupled to the embedded controller 210, the system memory 220, the firmware interface 230, the storage unit 240, and the functional hardware module 250 and may be a central processing unit (CPU), a micro-processor, a digital signal processing (DSP) chip, a field programmable gate array (FPGA), and any other programmable unit. Functions of the processing unit 260 may be implemented through an independent electronic device or an integrated circuit (IC) and may even be implemented as a software. In addition, the operation system 245 recorded by the storage unit 240, the advanced configuration and power interface source language program recorded by the firmware interface 230, the interface program, and other software modules may be stored to the system memory 220 through related processing data and files. As such, the processing unit 260 reads and processes in order to run the operation system 245 or other programs or procedures.

Figure 3:
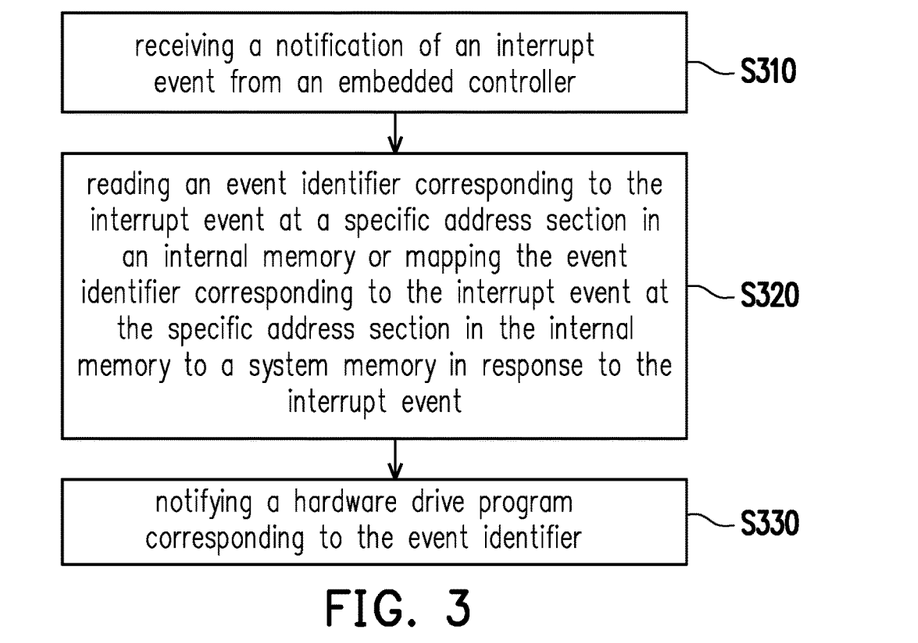
FIG. 3 is a flowchart of an interrupt event handling method according to an embodiment of the invention.

In order to better understand the operation flow the embodiments of the invention, numerous embodiments are listed to describe the operation of the computer system 2 of the embodiments of the invention in detail. FIG. 3 is a flowchart of an interrupt event handling method according to an embodiment of the invention. With reference to FIG. 3, the method of this embodiment is suitable for the computer system 2 of FIG. 2. In the following paragraphs, reference will be made to the components and modules of the computer system 2 for describing the method described the embodiments of the invention. Processes of the method may be adjusted according to the situation of implementation, and the invention is not limited thereto.

The embedded controller 210 responds to a triggering action (e.g., pressing a keyboard, pressing a button, switching a switch, etc.) of a peripheral device and triggers a corresponding interrupt event. As such, the processing unit 260 receives a notification of the interrupt event from the embedded controller 210 (step S310).

Figure 1:
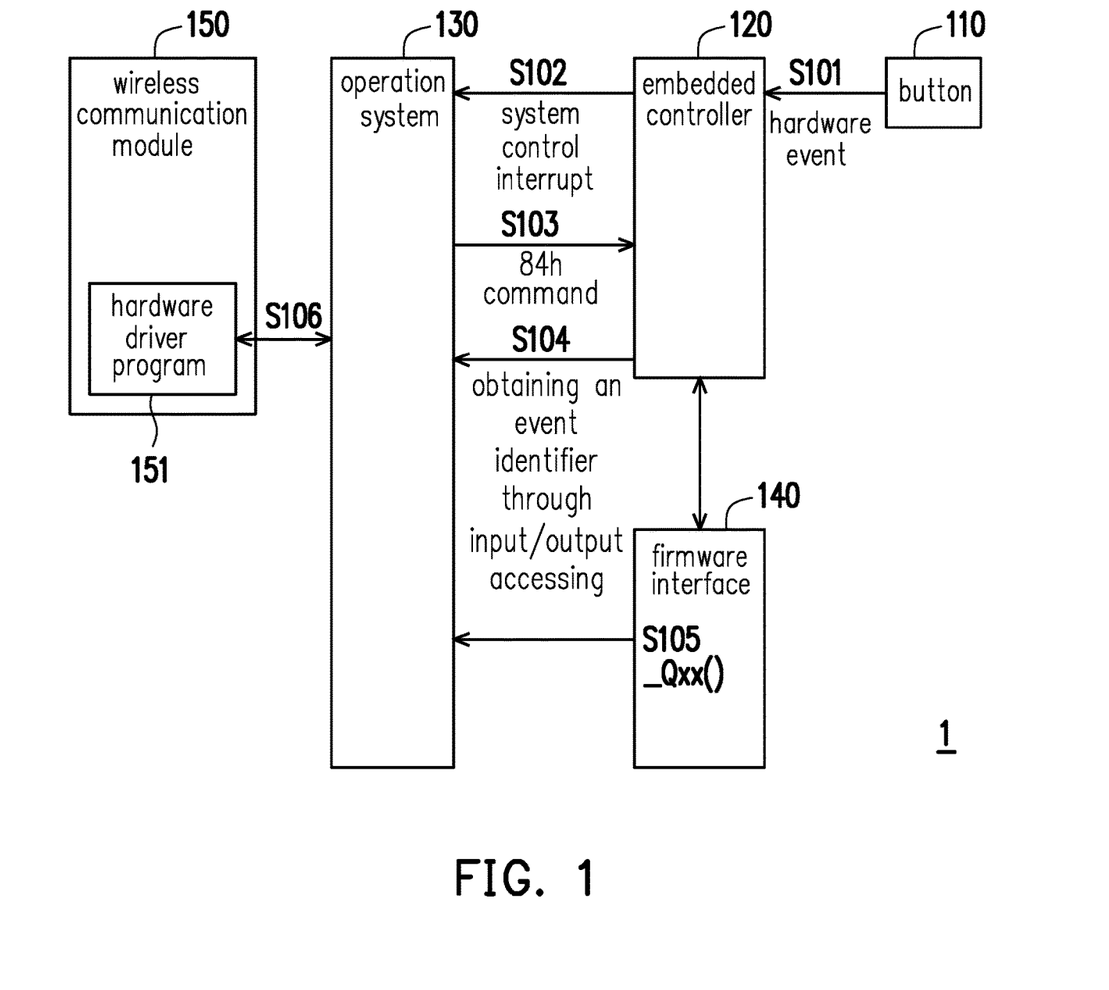
FIG. 1 is a flowchart of handling an interrupt event in a conventional computer system.

Different from the conventional technique shown in FIG. 1, the processing unit 260 of this embodiment reads an event identifier corresponding to the interrupt event at a specific address section in the internal memory 215 of the embedded controller 210, or the processing unit 260 maps the event identifier corresponding to the interrupt event at the specific address section in the internal memory 215 to the system memory 220 (step S320). That is, the processing unit 260 of this embodiment of the invention reads the specific address section in the internal memory 215 or in the system memory 220, so as to obtain the event identifier corresponding to the interrupt event. Comparing to the conventional technique in which the operation system issues a request through the 84h command and the embedded controller 210 has to search corresponding data in the internal memory 215 according to the 84h command, the processing unit 260 provided by the embodiments of the invention directly reads data of the internal memory 215, as such, a speed of handling the interrupt event may be effectively accelerated. Note that in another embodiment, the embedded controller 210 may pre-define the specific address section in the internal memory 215. In this way, the defined specific address section may be configured for storing the event identifier corresponding to the interrupt event. It is also worth noting that the operation of reading the event identifier by the processing unit 260 is described in detail in the embodiments as follows.

After obtaining the event identifier corresponding to the interrupt event in the internal memory 215 in the system memory 220, the processing unit 260 may notify the hardware driver program 255 corresponding to the event identifier (step S330). As such, the functional hardware module 250 corresponding to the hardware driver program 255 executes a corresponding operation (e.g., activating, de-activating, switching, or other functions).

Figure 4:
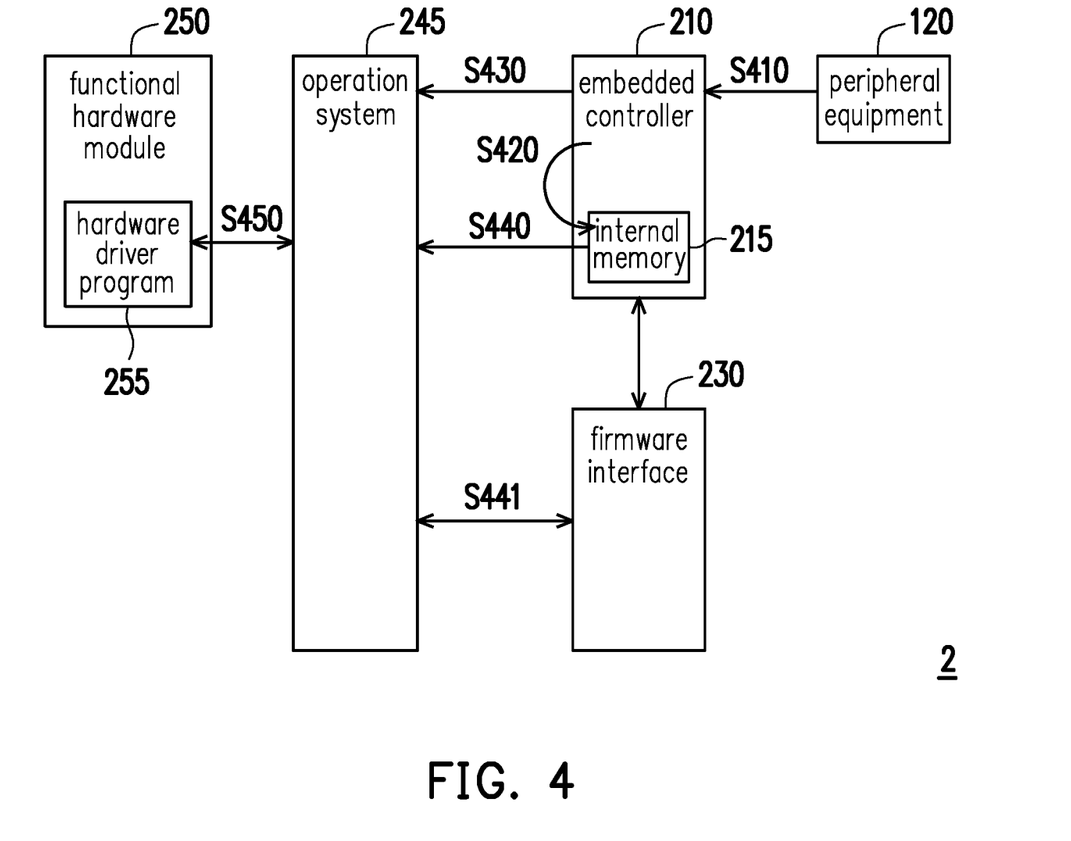
FIG. 4 is a flowchart of an interrupt event handling method according to an embodiment of the invention.

In order to better understand the spirit of the invention, other embodiments are listed and described in detail as follows. With reference to FIG. 4, when the peripheral device connected to the embedded controller 210 receives a hardware event of a triggering action (e.g., pressing, clicking, sliding, etc.) of any type (step S410), the embedded controller 210 detects the hardware event and generates a corresponding interrupt event (e.g., a system control interrupt (SCI)). In response to the interrupt event, the embedded controller 210 may store an event identifier (e.g., 0x26, 0x29, 0x28, etc.) corresponding to the interrupt event to the specific address section (e.g., a first address offset or other address sections) in the internal memory 215 (step S420).

For instance, Table (1) shows a relationship between the system control interrupt (SCI) and the corresponding event identifier (event ID).

TABLE 1

| SCI | SCI1 | SCI2 | SCI3 | SCI4 | SCI5 | SCI6 | SCI7 | SCI8 | ... |
|---|---|---|---|---|---|---|---|---|---|
| Event ID | 0 × 29 | 0 × 28 | 0 × 27 | 0 × 26 | 0 × 25 | 0 × 24 | 0 × 23 | 0 × 22 | ... |

In addition, in this embodiment, it is assumed that each of addresses in the internal memory 215 corresponds to data of one byte, and each of the addresses records one event identifier. The embedded controller 210 arranges multiple event identifiers in sequence in the internal memory 215 according to order of time or buffering and records a current byte count (ByteCnt) to the internal memory 215 to show a sum of the event identifiers stored in the internal memory 215.

For instance, in Table (2), row 2 to row 6 are processes recording different event identifiers in sequence to the internal memory 215, and different indexes represent different memory address offsets. The embedded controller 210 issues SCI1, SCI2, SCI3, and SCI4 in sequence and respectively records the corresponding event identifiers in index 1 to index 4.

TABLE 2

| ByteCnt | Index 1 | Index 2 | Index 3 | Index 4 | Index 5 | ... |
|---|---|---|---|---|---|---|
| 0 | 0 | 0 | 0 | 0 | 0 | ... |
| 1 | 0 × 29 | 0 | 0 | 0 | 0 | ... |
| 2 | 0 × 29 | 0 × 28 | 0 | 0 | 0 | ... |
| 3 | 0 × 29 | 0 × 28 | 0 × 27 | 0 | 0 | ... |
| 4 | 0 × 29 | 0 × 28 | 0 × 27 | 0 × 26 | 0 | ... |

Next, the embedded controller 210 notifies the operation system 245 of the interrupt event currently triggered, such that, the operation system 245 may receive the notification of the interrupt event from the embedded controller 210 (step S430). In addition, in response to receiving the interrupt event, the operation system 245 directly loads and calls an identifier access program. The identifier access program may be an advanced configuration and power interface source language (ASL) program, an interface program of the operation system 245, or an interface program recorded in the firmware interface 230 to communicate with the operation system 245. To be specific, when receiving one system control interrupt from an embedded controller, a conventional operation system queries about an event identifier corresponding to the system control interrupt through sending one 84h command and calls an Q event method (i.e., the _Qxx( ) program) recorded by the advanced configuration and power interface source language program only after obtaining the event identifier. In order to increase a processing speed, the operation system 245 of this embodiment no longer reads data through sending a command (sending of the query command (i.e., the 84h command) may be skipped, temporarily disabled, or disabled), and the operation system 245 may obtain the event identifier through reading memory instead. That is, the identifier access program of this embodiment records an access method of the event identifier, meaning that the identifier access program reads the event identifier recorded at the specific address section (i.e., the specific address section stored in step S420) in the internal memory 215 of the embedded controller 210. In response to the reading operation of the operation system 245, the embedded controller 210 sends the event identifier located at the specific address section (e.g., the Index 1 in Table (2)) in the internal memory 215 to the operation system 245. That is, when executing the identifier access program, the processing unit 260 may obtain the event identifier corresponding to the interrupt event at the specific address section in the internal memory 215 from the embedded controller 210 (step S440).

For instance, the identifier access program is the advanced configuration and power interface source language program, and the processing unit 260 runs the advanced configuration and power interface source language program through the firmware interface 230 (step S441). As such, the operation system 245 may obtain the corresponding event identifier. Note that corresponding to different firmware interface systems, embedded controller hardware, or operation systems, the identifier access program may be designed to be a different interface program, but the interface program is required to be able to communicate with the operation system 245 and the embedded controller 210.

Besides, other data may also be stored in the internal memory 215 according to different requirements. As such, in other embodiments, one indicator corresponding to the currently triggered event identifier may be designed in the identifier access program, and an address of the indicator may be moved and is not necessary to be fixed to point at a certain address section.

After obtaining the event identifier, the identifier access program further records a corresponding notification process (e.g., a switch condition, a if condition statement, and the like). That is, different event identifiers have corresponding notification contents to inform the operation system 245 of the event currently triggered. For instance, in response to obtaining an event identifier of 0x29, the operation system 245 is notified of triggering of a wireless network button event (e.g., a syntax of Notify(\_B.WLBU, 0x80)). Next, the operation system 245 notifies the corresponding hardware driver program 255 (step S450) to control the functional hardware module to activate or deactivate the wireless communication function, for example. If more than one event identifier exists in the internal memory 215, the processing unit 260 notifies the corresponding hardware driver program 255 according to an order of the event identifiers in the internal memory 215. In addition, the embedded controller 210 may remove the corresponding event identifier being accessed or processed from the internal memory 215, such that a storage space is used more effectively.

It is worth noting that the processing unit 260 is more efficient (faster speed and shorter accessing time) in accessing the system memory 220 directly than accessing the internal memory 215. Moreover, the internal memory 215 is limited to a relatively less storage capacity (approximately 64, 128, or 256 bytes). When simultaneously encountering numeral (e.g., 5, 10, 20, or greater) interrupt events or being provided with extremely short interval time, the processing unit 260 may demonstrate greater efficiency in directly accessing the system memory 220.

Different from the previous embodiment, in step S440, the identifier access program further maps the data (i.e., the event identifier corresponding to the interrupt event in step S430 or further including one or more other event identifiers being triggered) recorded at the specific address section in the internal memory 215 into the system memory 220 with the same arrangement order. In this way, the operation system 245 may obtain the event identifier from the system memory 220. That is, the identifier access program of this embodiment records a mapping action and reads content at the specific address section in the system memory 220. If data which is not accessed by the operation system 245 exists in the system memory 220, the processing unit 260 appends data recorded by the internal memory 215 at this time behind the data which is not processed by the operation system 245 in the system memory 220. After the data is mapped to the system memory 220, the embedded controller 210 further clears the data being mapped to the system memory 220 in the internal memory 215 (e.g., resetting the internal memory 215 or removing content related to the event identifier, and the like).

For instance, the second row in Table (3) shows the data recorded by the internal memory 215 before mapping, wherein each cell corresponds to one memory address. It is assumed that the interrupt event SCI1 to the interrupt event SCI4 occur simultaneously or occur approximately at the same time. The identifier access program maps the event identifiers recorded in the internal memory 215 to the system memory 220 with the same sorting order, as shown in the fourth row. In addition, the event identifiers recorded by the internal memory 215 are removed after being mapped, as shown in the sixth row:

TABLE 3

| storing condition of the internal memory 215 before mapping | | | | | |
|---|---|---|---|---|---|
| 4 | 0 × 29 | 0 × 28 | 0 × 27 | 0 × 26 | ... |
| storing condition of the system memory 220 after mapping | | | | | |
| 4 | 0 × 29 | 0 × 28 | 0 × 27 | 0 × 26 | ... |
| storing condition of the internal memory 215 after mapping | | | | | |
| 0 | 0 | 0 | 0 | 0 | ... |

Based on the example scenario shown in Table (3), it is assumed that interrupt events SCI5 to SCI9 occur simultaneously, the second, fourth, and the sixth rows in Table (4) respectively show the data recorded by the internal memory 215 before mapping, the data recorded by the system memory 220 after mapping, and the data recorded by the internal memory 215 after mapping:

TABLE 4

| storing condition of the internal memory 215 before mapping | | | | | | | | | |
|---|---|---|---|---|---|---|---|---|---|
| 5 | 0 × 25 | 0 × 24 | 0 × 23 | 0 × 22 | 0 × 21 | 0 | ... | ... | ... |
| storing condition of the system memory 220 after mapping | | | | | | | | | |
| 9 | 0 × 29 | 0 × 28 | 0 × 27 | 0 × 26 | 0 × 25 | 0 × 24 | 0 × 23 | 0 × 22 | 0 × 21 |
| storing condition of the internal memory 215 after mapping | | | | | | | | | |
| 0 | 0 | 0 | 0 | 0 | 0 | ... | ... | ... | ... |

Since the interrupt events SCI1 to SCI4 are not processed, the event identifiers of the interrupt events SCI5 to SCI9 are appended behind the interrupt events SCI1 to SCI4.

Note that when multiple triggering actions of the peripheral devices occur simultaneously, the embedded controller 210 may notify the operation system 245 of one interrupt event only, and the rest of the actions do not trigger the interrupt events. In the embodiments of the invention, since multiple event identifiers may be mapped in response to receiving one interrupt event, the rest of the actions that do not trigger the interrupt events may still complete corresponding driving operations (i.e., driving the corresponding functional module 250). In contrast, in the conventional technique, one interrupt event notification triggers only one 84h command to obtain one event identifier, and thereby, only one driving operation of one peripheral device may be completed.

In addition, since multiple event identifiers may be recorded by the system memory 220, one certain event identifier is to be removed after being processed by the operation system 245. The identifier access program then re-sorts the event identifiers that are not processed (i.e., shifting the event identifiers). Besides, if more than one event identifier exists in the system memory 220, the processing unit 260 notifies the corresponding hardware driver program 255 according to an order of the event identifiers in the system memory 220.

In another aspect, different interrupt events may represent different levels of priority (or severity, importance, or timeliness) for the operation system 245. When multiple interrupt events occur simultaneously or extremely short interval time is provided, an interrupt event with a greater level of priority (e.g., a power button is pressed, system overheating is detected by a temperature sensor, or low battery is reported and the like) is required to be processed as soon as possible, such that processing of an urgent event is not delayed rather than an interrupt event with a low level of priority or with no priority is processed first. In another embodiment, in response to occurrence of a hardware event, the embedded controller 210 further provides a leading byte according to a level of priority of an interrupt event generated by the hardware event and simultaneously records the leading byte and an event identifier of the interrupt event to the internal memory 215 of the embedded controller 210 itself.

For instance, the second row and the fourth row in Table (5) respectively show the data recorded by the internal memory 215 before mapping and the data recorded by the system memory 220 after mapping. It is assumed that the interrupt events SCI1 to SCI4 occur simultaneously, the interrupt event SCI2 has a middle-to-high level of priority, and a leading byte (0x81) is appended ahead of the event identifier. The leading bytes represent priority, and 0x80, 0x81, 0x82 . . . represent a highest level of priority to a lower level of priority in this embodiment. Nevertheless, in other embodiments, other encodings or representatives may also be used for representing:

TABLE 5

| storing condition of the internal memory 215 before mapping | | | | | |
|---|---|---|---|---|---|
| 5 | 0 × 29 | 0 × 81 | 0 × 28 | 0 × 27 | 0 × 26 |
| storing condition of the system memory 220 after mapping | | | | | |
| 5 | 0 × 29 | 0 × 81 | 0 × 28 | 0 × 27 | 0 × 26 |

Based on the example scenario shown in Table (5), it is assumed that interrupt events SCI5 to SCI9 simultaneously occur subsequently, the second and the fourth rows in Table (6) respectively show the data recorded by the internal memory 215 before mapping and the data recorded by the system memory 220 after mapping. Among them, levels of priority of the interrupt events SCI5, SCI7, and SCI8 are different (respectively represented by 0x80, 0x82, and 0x83):

TABLE 6

| storing condition of the internal memory 215 before mapping | | | | | | | | |
|---|---|---|---|---|---|---|---|---|
| 8 | 0 × 80 | 0 × 25 | 0 × 24 | 0 × 82 | 0 × 23 | 0 × 83 | 0 × 22 | 0 × 21 ... |

| storing condition of the system memory 220 after mapping | | | | | | | | | | | | |
|---|---|---|---|---|---|---|---|---|---|---|---|---|
| 13 | 0 × 29 | 0 × 81 | 0 × 28 | 0 × 27 | 0 × 26 | 0 × 80 | 0 × 25 | 0 × 24 | 0 × 82 | 0 × 23 | 0 × 83 | 0 × 22 | 0 × 21 ... |

It is worth noting that in other embodiments, the leading byte may also be arranged behind the corresponding event identifier.

Figure 5:
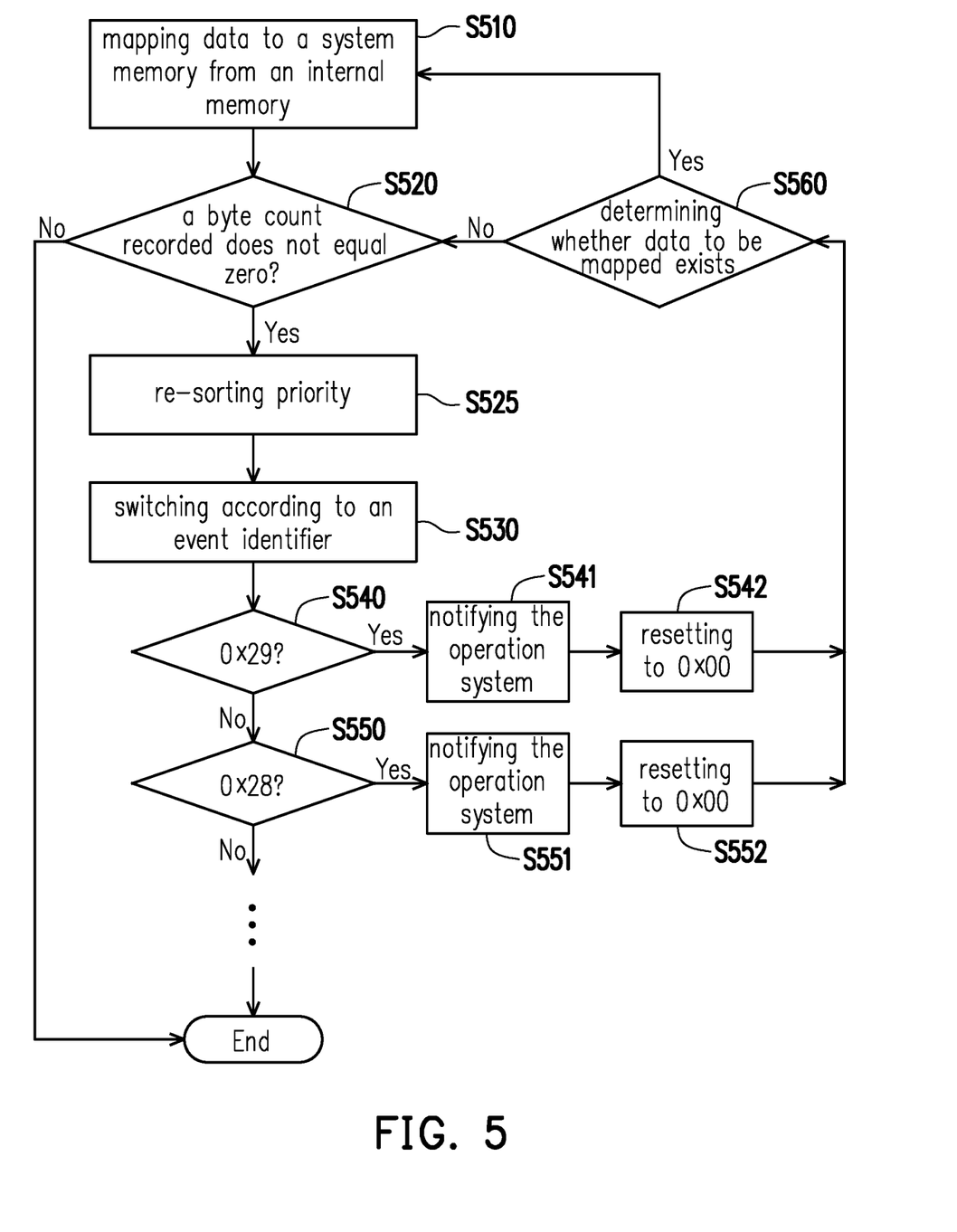
FIG. 5 is a flowchart of a handling an event identifier according to an embodiment of the invention.

Next, in order to allow an interrupt event with priority to be processed as soon as possible, with reference to FIG. 5, after the data is mapped to the system memory 220 from the internal memory 215 (step S510), the processing unit 260 determines whether the byte count recorded in the system memory 220 does not equal zero (i.e., whether a to-be-processed event identifier exists) (step S520). If the byte count does not equal zero, the processing unit 260 re-sorts the event identifiers recorded in the system memory 220 according to the levels of priority (step S525).

The processing unit 260 sorts the event identifier having the leading byte and the leading byte ahead of the data of the rest of the event identifiers recorded by the system memory 220 based on the levels of priority. If the system memory 220 records more than one leading byte, the processing unit 260 further sorts the corresponding event identifiers according to the levels of priority of the different leading bytes (e.g., the levels of priority (0x80~0x83) sorted in Table (5)). In this way, the event identifier with a higher level of priority is sorted at the front.

Taking Table (7) for example, the first row represents a data storage condition of the data of the internal memory 215 which is mapped into the system memory 220 but is not yet sorted, and the data closer to the left side in the table is processed earlier. Since a highest level of priority (0x80) is recorded in the system memory 220, a corresponding leading byte 0x80 and the corresponding event identifier thereof are moved next to the byte count, as shown in the second row. A leading byte 0x81 of a second highest level of priority and a corresponding event identifier thereof are further moved next to the event identifier with the highest level of priority, as shown in the third row. A leading byte 0x82 of a third highest level of priority and a corresponding event identifier thereof are further moved next to the event identifier with the second highest level of priority, as shown in the fourth row. A leading byte 0x83 of a fourth highest level of priority and a corresponding event identifier thereof are further moved next to the event identifier with the third highest level of priority, as shown in the fifth row. The rest of the event identifiers with no priority are arranged based on an original order.

TABLE 7

| 13 | 0 × 29 | 0 × 81 | 0 × 28 | 0 × 27 | 0 × 26 | 0 × 80 | 0 × 25 | 0 × 24 | 0 ×82 | 0 × 23 | 0 × 83 | 0 × 22 | 0 × 21 ... |
|---|---|---|---|---|---|---|---|---|---|---|---|---|---|
| 13 | 0 × 80 | 0 × 25 | 0 × 29 | 0 × 81 | 0 × 28 | 0 × 27 | 0 × 26 | 0 × 24 | 0 × 82 | 0 × 23 | 0 × 83 | 0 × 22 | 0 × 21 ... |
| 13 | 0 × 80 | 0 × 25 | 0 × 81 | 0 × 28 | 0 × 29 | 0 × 27 | 0 × 26 | 0 × 24 | 0 × 82 | 0 × 23 | 0 × 83 | 0 × 22 | 0 × 21 ... |
| 13 | 0 × 80 | 0 × 25 | 0 × 81 | 0 × 28 | 0 × 82 | 0 × 23 | 0 × 29 | 0 × 27 | 0 × 26 | 0 × 24 | 0 × 83 | 0 × 22 | 0 × 21 ... |
| 13 | 0 × 80 | 0 × 25 | 0 × 81 | 0 × 28 | 0 × 82 | 0 × 23 | 0 × 83 | 0 × 22 | 0 × 29 | 0 × 27 | 0 × 26 | 0 × 24 | 0 × 21 ... |

Next, the processing unit 260 continues to execute the identifier access program and switches to a corresponding notification program according to the event identifier (sorted at the foremost address) (step S530). If the currently-processed event identifier is 0x29 (step S540), the operation system 245 is notified of an event content corresponding to the event identifier (step S541). If the currently-processed event identifier is 0x28 (step S550), the operation system 245 is notified of an event content corresponding to the event identifier (step S551). Other examples may be deduced by analogy. After the operation system 245 is notified, the processing unit 260 then notifies the hardware driver program 255 corresponding to the functional hardware module 250 according to the event identifier sorted at the specific address section (e.g., the address in the third column to the left of Table (7)) in the system memory 220 and accordingly controls the functional hardware module 250.

If a certain event identifier is processed, the processing unit 260 resets the processed event identifier and together with the leading byte thereof (if any) in the system memory 220 to 0x00 or fills in other codes that are not used for indicating the SCI or priority (step S542 and step S552).

For instance, Table (8) shows the event identifier and together with the leading byte thereof are reset to 0x00.

TABLE 8

| 13 | 0 × 00 | 0 × 00 | 0 × 81 | 0 × 28 | 0 × 82 | 0 × 23 | 0 × 83 | 0 × 22 | 0 × 29 | 0 × 27 | 0 × 26 | 0 × 24 | 0 × 21 ... |
|---|---|---|---|---|---|---|---|---|---|---|---|---|---|

Next, the processing unit 260 confirms that whether the byte count recorded in the internal memory 215 of the embedded controller 210 is greater than zero, or the operation system 245 confirms that whether a new interrupt event is triggered, so as to confirms that whether data to be mapped is stored in the internal memory 215 (step S560). Returning to step S510 if the data to be mapped exists to perform the mapping operation. Returning to step S520 if no data to be mapped exists to confirm that whether an event identifier to be processed exists in the system memory 220, and the data in the system memory 220 is re-sorted in step S525.

Note that in order to allow the event identifiers with priority to be arranged at the front as possible, when at least one new event identifier in the internal memory 215 is mapped to the system memory 220, the processing unit 260 has to re-sort the data in the system memory 220 according to priority and add other event identifier or leading byte to the previously-stored addresses (e.g., the second column and the third column to the left of Table (8)) of the processed event identifiers. Moreover, the byte count recorded in the system memory 220 is required to be accordingly adjusted (step S525). Note that in step S525, the processing unit 260 further removes the reset data (i.e., the processed event identifier). As such, the unprocessed event identifier can be recorded at the same address, and data obfuscation is prevented from happening as re-sorting and removal are executed simultaneously after the event identifier corresponding to the newly-triggered interrupt event is mapped into the system memory 220.

In addition, in some embodiments, the processing unit 260 may first remove all leading bytes recorded in the system memory 220 after sorting based on priority ends. Other event identifiers arranged behind are shifted in sequence to fill the memory addresses of the removed leading bytes, and that the operation system 245 only has to access the data of the address sorted at the front. For instance, Table (9) shows a storing condition of removing the leading bytes based on the content of Table (7) after re-sorting:

TABLE 9

| 13 | 0 × 25 | 0 × 28 | 0 × 23 | 0 × 22 | 0 × 29 | 0 × 27 | 0 × 26 | 0 × 24 | 0 × 21 | ... |
|----|--------|--------|--------|--------|--------|--------|--------|--------|--------|-----|

Nevertheless, the leading bytes are retained in preferred embodiments in consideration of a new event identifier with priority may still be processed first after being mapped. As such, the new event identifier is processed first through re-sorting.

In view of the foregoing, in the embodiments of the invention, the input/output (I/O) reading method is no longer used to inquire the corresponding event identifier, and the memory accessing method is used instead to query the interrupt event for increasing processing efficiency. Besides, the event identifier is obtained through the memory of the embedded controller, and the data of the memory of the embedded controller may also be mapped to the system memory. In this way, the operation system may access the system memory, the processing speed is thereby accelerated, and the memory accessing method may thus be applied when a large amount of interrupt events occur. Further, priority is given to the event identifier, and therefore, a more applicable schedule process is provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interrupt event handling method, adapted to a computer system, wherein the computer system has an embedded controller (EC), and the interrupt event handling method comprises:
   receiving a notification of an interrupt event from the embedded controller;
   mapping an event identifier corresponding to the interrupt event at a specific address section in an internal memory of the embedded controller to a system memory and reading the event identifier from the system memory in response to receive the notification of the interrupt event, comprising:
      storing the event identifier corresponding to the interrupt event to the specific address section in the internal memory of the embedded controller; and
      mapping data recorded at the specific address section in the internal memory to the system memory; and
   notifying a hardware driver program corresponding to the event identifier.

2. The interrupt event handling method as claimed in claim 1, wherein the step of mapping the event identifier corresponding to the interrupt event at the specific address section in the internal memory of the embedded controller to the system memory comprises:
   removing the data in the internal memory being mapped to the system memory.

3. The interrupt event handling method as claimed in claim 1, wherein the data recorded at the specific address section in the internal memory further comprises a plurality of other triggered event identifiers.

4. The interrupt event handling method as claimed in claim 1, wherein the step of mapping the event identifier corresponding to the interrupt event at the specific address section in the internal memory of the embedded controller to the system memory in response to the interrupt event comprises:
   calling an identifier access program to execute an access operation for the event identifier, wherein the identifier access program is an advanced configuration and power interface source language (ASL) program, an interface program of an operation system (OS) run by the computer system, or an interface program recorded in a firmware interface of the computer system to communicate with the operation system.

5. The interrupt event handling method as claimed in claim 1, wherein the step of mapping the data recorded at the specific address section in the internal memory to the system memory comprises:
   appending the data recorded at the specific address section in the internal memory behind unprocessed data in the system memory.

6. The interrupt event handling method as claimed in claim 1, further comprising the following step before the step of mapping the data recorded at the specific address section in the internal memory to the system memory:
   providing, by the embedded controller, a leading byte according to priority of the interrupt event; and
   recording, by the embedded controller, the leading byte and the event identifier of the interrupt event to the internal memory.

7. The interrupt event handling method as claimed in claim 6, wherein the step of mapping the data recorded at the specific address section in the internal memory to the system memory comprises:

sorting the event identifier and the leading byte ahead of other data related to the event identifier recorded in the system memory.

8. The interrupt event handling method as claimed in claim 7, further comprising the following step before the step of sorting the event identifier and the leading byte ahead of the other data related to the event identifier recorded in the system memory:

sorting corresponding two event identifiers according to priority of the leading byte and another leading byte if the another leading byte is recorded in the system memory.

9. The interrupt event handling method as claimed in claim 1, wherein the step of notifying the hardware driver program corresponding to the event identifier comprises:

notifying the corresponding hardware driver program according to an order of the event identifier in the system memory.

10. The interrupt event handling method as claimed in claim 9, wherein the interrupt event handling method further comprises the following step after the corresponding hardware driver program is notified:

removing a processed event identifier in the system memory and re-sorting unprocessed data in the system memory in response to removal of the processed event identifier or mapping of at least one new event identifier to the system memory from the internal memory of the embedded controller.

11. A computer system, comprising:

an embedded controller, having an internal memory and triggering an interrupt event;

a system memory; and a processing unit, coupled to the embedded controller and the system memory, receiving a notification of the interrupt event from the embedded controller; mapping an event identifier corresponding to the interrupt event at a specific address section in the internal memory to the system memory and reading the event identifier from the system memory in response to receive the notification of the interrupt event, the processing unit notifying a hardware driver program corresponding to the event identifier, wherein the embedded controller stores the event identifier corresponding to the interrupt event to the specific address section in the internal memory, and the processing unit maps data recorded at the specific address section in the internal memory to the system memory.

12. The computer system as claimed in claim 11, wherein the embedded controller removes the data being mapped to the system memory in the internal memory.

13. The computer system as claimed in claim 11, wherein the data recorded at the specific address section in the internal memory further comprises a plurality of other triggered event identifiers.

14. The computer system as claimed in claim 11, wherein the processing unit calls an identifier access program to execute an access operation for the event identifier, wherein the identifier access program is an advanced configuration and power interface source language program, an interface program of an operation system run by the computer system, or an interface program recorded in a firmware interface to communicate with the operation system.

15. The computer system as claimed in claim 11, wherein the processing unit appends the data recorded at the specific address section in the internal memory behind data unprocessed by the processing unit in the system memory.

16. The computer system as claimed in claim 11, wherein the embedded controller provides a leading byte according to priority of the interrupt event, and the embedded controller records the leading byte and the corresponding event identifier of the interrupt event to the internal memory.

17. The computer system as claimed in claim 16, wherein the processing unit sorts the event identifier and the leading byte ahead of other data related to the event identifier recorded in the system memory.

18. The computer system as claimed in claim 16, wherein the processing unit sorts corresponding two event identifiers according to priority of the leading byte and another leading byte if the another leading byte is recorded in the system memory.

19. The computer system as claimed in claim 11, further comprising:

a functional hardware module related to the event identifier, coupled to the processing unit, wherein the processing unit notifies the hardware driver program of the functional hardware module according to an order of the event identifier in the system memory.

20. The computer system as claimed in claim 18, wherein the processing unit removes a processed event identifier in the system memory and re-sorts unprocessed data by the processing unit recorded in the system memory in response to removal of the processed event identifier or mapping of at least one new event identifier to the system memory from the internal memory.

21. The interrupt event handling method as claimed in claim 1, further comprising:

directly reading the event identifier corresponding to the interrupt event at the specific address section in the internal memory of the embedded controller without sending a command for the event identifier.

22. The computer system as claimed in claim 11, wherein the processing unit directly reads the event identifier corresponding to the interrupt event at the specific address section in the internal memory of the embedded controller without sending a command for the event identifier.

* * * * *